US009764661B2

(12) United States Patent
Hansen et al.

(10) Patent No.: US 9,764,661 B2
(45) Date of Patent: Sep. 19, 2017

(54) STOWABLE SEATS (71) Applicant: Toyota Motor Engineering & Manufacturing North America, Inc., Erlanger, KY (US)

(72) Inventors: Charles S. Hansen, Northville, MI (US); Todd R. Muck, Fowlerville, MI (US); Christopher M. Vargo, Plymouth, MI (US); Vasudeva S. Murthy, Ann Arbor, MI (US); John J. Salvia, III, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/989,084

(22) Filed: Jan. 6, 2016

(65) Prior Publication Data
US 2017/0190267 A1 Jul. 6, 2017

(51) Int. Cl.
*B60N 2/02* (2006.01)
*B60N 2/12* (2006.01)

(52) U.S. Cl.
CPC ............. *B60N 2/12* (2013.01); *B60N 2/0232* (2013.01); *B60N 2002/0236* (2013.01)

(58) Field of Classification Search
CPC . B60N 2/12; B60N 2/0232; B60N 2002/0236
See application file for complete search history.

(56) References Cited

U.S. PATENT DOCUMENTS

| 4,074,886 | A | 2/1978 | Yates |
|---|---|---|---|
| 4,773,703 | A | 9/1988 | Krugener et al. |
| 5,370,444 | A | 12/1994 | Stulik |
| 5,570,931 | A | 11/1996 | Kargilis et al. |
| 6,428,102 | B1 | 8/2002 | Becker et al. |
| 6,601,918 | B2 | 8/2003 | Mattsson |
| 7,152,900 | B2 | 12/2006 | Trombley et al. |
| 7,637,568 | B2 | 12/2009 | Meeker et al. |
| 8,011,728 | B2 | 9/2011 | Kohl et al. |
| 8,128,167 | B2 | 3/2012 | Zhong et al. |
| 8,408,646 | B2 | 4/2013 | Harper et al. |
| 8,534,750 | B2 * | 9/2013 | Sayama ............ B60N 2/01583 296/65.09 |
| 8,651,550 | B2 | 2/2014 | Mather et al. |
| 2013/0300171 | A1 | 11/2013 | Wiegelmann et al. |

* cited by examiner

*Primary Examiner* — Lori L Lyjak
(74) *Attorney, Agent, or Firm* — Dinsmore & Shohl LLP (57) ABSTRACT

A stowable seat for a vehicle is provided including a seat portion pivotably connected to a back portion, the back portion having a first base portion and a first extendable portion, the first extendable portion movable from a stowed position to an extended position, the extended position defined when the first extendable portion is spaced apart from the first base portion the seat portion having a second base portion and a second extendable portion, the second extendable portion movable from a stowed position to an extended position, the extended position defined when the second extendable portion is spaced apart from the second base portion. The seat assembly may be configured to move to a stowed position only after the first extendable portion of the back portion and the second extendable portion of the seat portion are moved to the stowed position.

20 Claims, 11 Drawing Sheets

STOWABLE SEATS

TECHNICAL FIELD

The present specification relates generally to a stowable seat for a vehicle, more specifically, a stowable seat for a vehicle having extendable portions allowing the seat to fit in a vehicle floor bucket.

BACKGROUND

Current vehicle seats exist with a capability of stowing into a compartment within a vehicle. The vehicle seat commonly folds onto itself to a compact position to be stowed within a compartment. However, when the vehicle seat is folded onto itself, the seat is still large thus requiring a large compartment within the vehicle floor.

Accordingly, a need exists for an alternative stowable seat for a vehicle having a more compact configuration.

SUMMARY

In one embodiment, a stowable seat for a vehicle may include a seat portion pivotably connected to a back portion, the back portion having a first base portion and a first extendable portion, the first extendable portion movable from a stowed position to an extended position, the extended position defined when the first extendable portion is spaced apart from the first base portion the seat portion having a second base portion and a second extendable portion, the second extendable portion movable from a stowed position to an extended position, the extended position defined when the second extendable portion is spaced apart from the second base portion. The seat assembly may be configured to move to a stowed position only after the first extendable portion of the back portion and the second extendable portion of the seat portion are moved to the stowed position.

In another embodiment, a vehicle 10 provided including a compartment within a vehicle floor, a seat having at least one extendable portion where the seat is movable from a use position to a stowed position. The use position defined when the extendable portion is in an at least partially extended position. The stowed position defined when the extendable portion is not extended and the seat is stowed in the compartment of the vehicle.

In yet another embodiment, a stowable seat may include a seat portion pivotably connected to a back portion, the seat portion connected to a floor within the vehicle, a storage portion on the floor, the seat portion and the back portion stowable within the storage portion; and one of the back portion or the seat portion having a base portion and an extendable portion, the extendable portion movable from a stowed position to an extended position, the extended position defined when the extendable portion is spaced apart from the base portion. The seat assembly may be configured to move to a stowed position only after the extendable portion and the extendable portion are moved to the to the stowed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
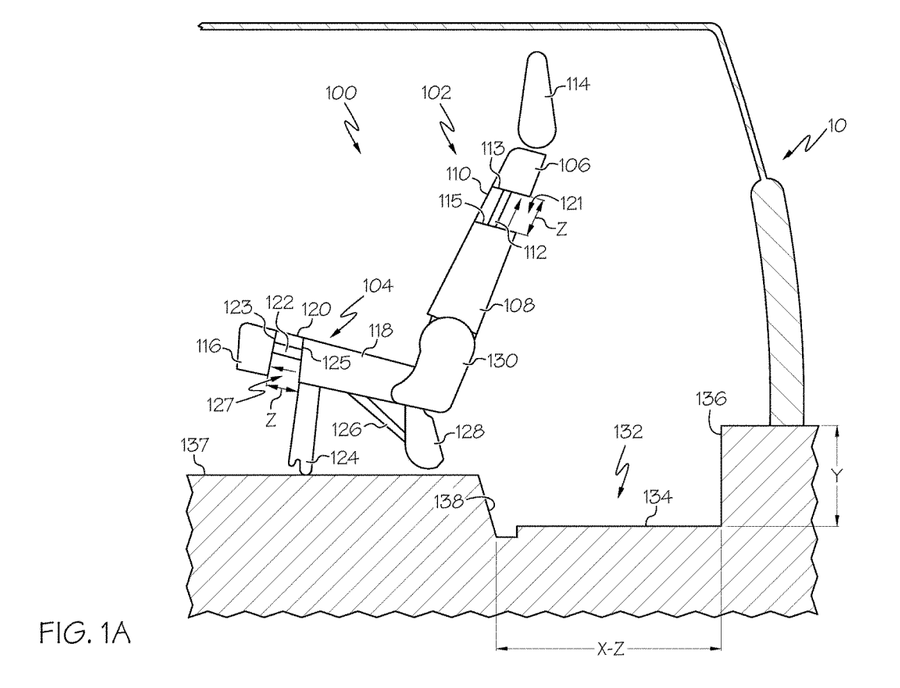
FIG. 1A depicts a side view of a stowable vehicle seat and corresponding compartment according to one or more embodiments shown and described herein.
Figure 1B:
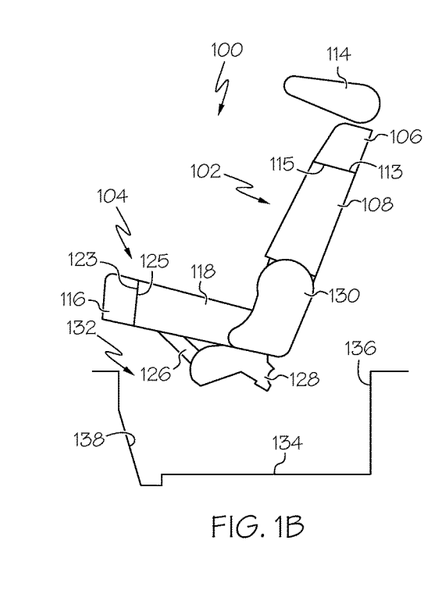
FIG. 1B depicts the stowable seat and corresponding compartment in a midway position between a use and stowed position according to one or more embodiments shown and described herein.
Figure 1C:
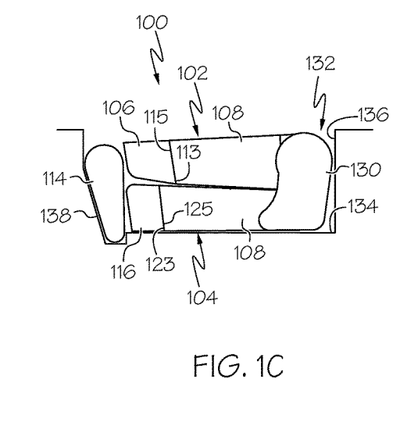
FIG. 1C depicts the stowable vehicle seat within the corresponding compartment according to one or more embodiments shown and described herein.
Figure 2:
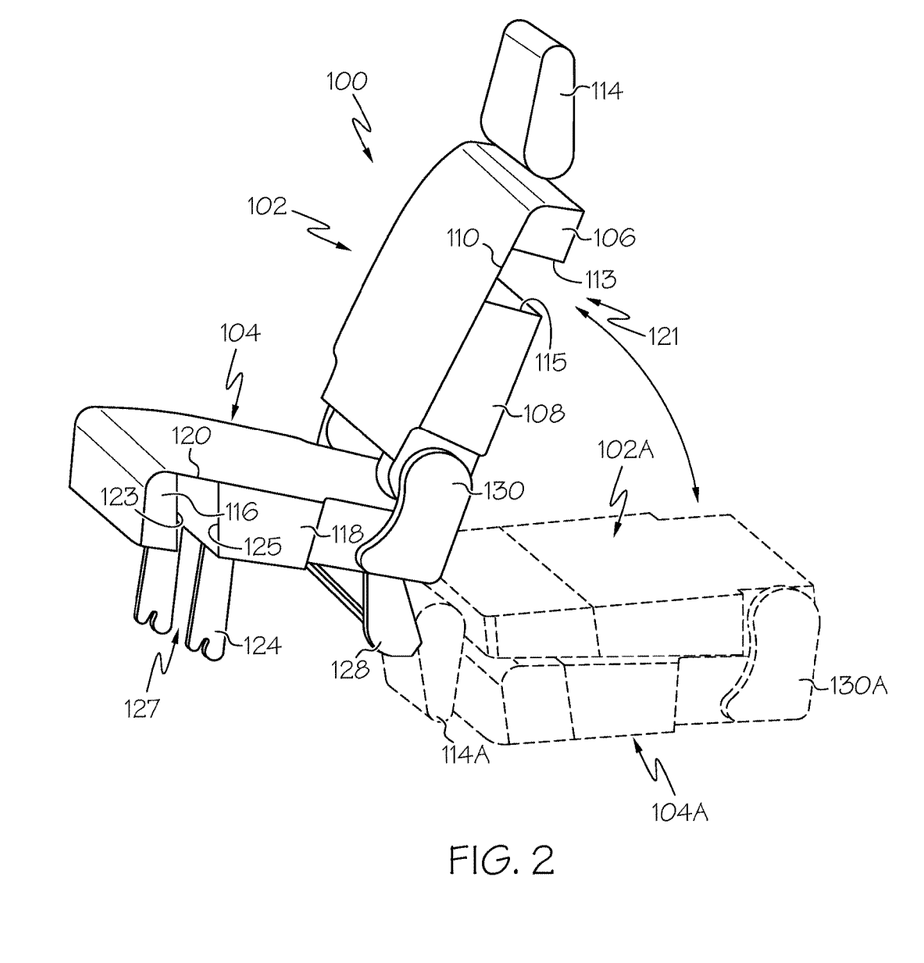
FIG. 2 illustrates a use position and stowed position of the stowable vehicle seat according to one or more embodiments shown and described herein.

FIGS. 1A-1C generally depict one embodiment of a stowable seat and corresponding compartment within a vehicle 10. The stowable seat includes a back portion pivotably connected to a seat portion. In this embodiment, both the back portion and the seat portion have extendable portions movable from a stowed position to a use position. In the stowed position, the extendable portions are directly adjacent to and contiguous with the base portions of both the back portion and the seat portion. In the use position, the extendable portions are spaced apart from the base portions of both the back portion and the seat portion.

Referring now to FIG. 1A, a stowable seat connected to a floor adjacent to a compartment is provided. The seat includes at least one extendable portion allowing both or either of the seat portion or back portion to extend when in a use position. When not in a use position, the seat portion and/or the back portion retract to accommodate a smaller compartment thus reducing required storage space. Various embodiments of the stowable seat and operation of the stowable seat will be described in more detail herein.

Referring now to FIGS. 1A-1C, a stowable seat 100 includes a back portion 102 and a seat portion 104. The back portion 102 includes a base portion 108 and an extendable portion 106. Similarly, the seat portion 104 includes a base portion 118 and an extendable portion 116. The stowable seat 100 generally includes a headrest 114 pivotable with respect to the back portion 102. The back portion 102 is pivotable with respect to the seat portion 104. Trim portion 130 is positioned at the pivot point between the back portion 102 and the seat portion 104.

The seat portion 104 is connected to a vehicle floor 137 when in a use position, such as illustrated in FIG. 1A. The seat portion 104 connects to the vehicle floor 137 by means of connector structure 124, 126, 128 which are all foldable to move from a use position to a stowed position.

The vehicle floor 137 includes an indented compartment 132. The compartment 132 includes side walls 136, 138 and a lower wall 134 which combined form the compartment 132 configured to accept the seat 100 when not in use.

The back portion 102 includes the base portion 108 and the extendable portion 106. The extendable portion 106 is movable with respect to the base portion 108 by an adjustment mechanism 112. In the embodiment as shown in FIGS. 1A, 1B, 1C and 2, the adjustment mechanism is a general adjustment mechanism.

Various embodiments of the adjustment mechanism 112 will be discussed herein as illustrated by FIGS. 3A-6D. When in an extended position, such as illustrated in FIG. 1A, an edge 113 of the extendable portion 106 is spaced apart from an edge 115 of the base portion 108. In this use position, the edge 113 is spaced apart a distance Z from the edge 115. This spaced apart configuration in the release position creates a cavity 121 between the edges 113, 115 and a trim cover 110a in the use position. The trim cover 110a may be a cloth, leather, and/or vinyl material made of the same material of the remainder of the seat 100.

In a similar configuration, when in a use position, an edge 123 of the extendable portion 116 is spaced apart from the edge 125 of the base portion 118 of the seat portion 104. The adjustment mechanism 122 will be detailed in various embodiments as illustrated in FIGS. 3A-6D. When in the use position, a cavity 127 is created between a trim cover 120, the edge 123, and the edge 125 thereby spacing the edge 123 apart from the edge 125 a distance Z. In this embodiment, the distance Z may vary anywhere between 5 centimeters up to 100 centimeters depending on various packaging requirements.

The trim cover 120 may be made of a vinyl, leather, cloth or other suitable material for use within vehicle 10. An additional foam or cushion piece (not shown) may be provided beneath the trim cover 120. The back portion 102 and the seat portions 104 are made of a combination of trim cover material, such as discussed above, cushion, foam and metal or plastic structural components. The connector structures 124, 126, 128 are typically made of a metal such as steel, steel alloys, or various strong plastic or polymers.

When the seat 100 is operated and moved from a use position to a stowed position, the extendable portions 106, 116 slowly move in towards the base portions 108, 118 as the seat 100 as a whole collapses. With reference again to the movement as illustrated in FIGS. 1A, 1B, 1C and 2, the seat 100 moves from a use position (FIG. 1A) to a stowed position (FIG. 1C) with an intermediate position (FIG. 1B) during the transition between the use position and the stowed position. This movement is actuated either manually by the user or by a mechanically driven actuator or motor. In a preferred embodiment, the user simply presses a button and the seat assembly as a whole moves from the use position (FIG. 1A) to the stowed position (FIG. 1C).

When a user uses the seat 100, the user actuates movement of the entire seat by means of a button or a manual movement. If the movement is manual, the extendable portions 106, 116 move in towards the base portions 108, 118. If the extendable portions 106, 116 are not moved in to abut the base portions 108, 118, the seat 100 will not fit within the bucket storage compartment within the floor. The extendable portions 106, 116 are moved either before actuation of the folding of the seat 100 or while actuation of the folding of the seat 100 is occurring (i.e. the movement as illustrated in FIGS. 1A-1C).

Now referring to FIGS. 3A-3D, an alternative embodiment of the stowable seat 200 is illustrated. The stowable seat 200 includes a back portion 252 and a seat portion 254 is illustrated. The back portion 252 includes a base portion 258 and an extendable portion 256. Similarly, the seat portion 254 includes a base portion 268 and an extendable portion 266. The stowable seat 200 generally includes a headrest 214 pivotable with respect to the back portion 252. The back portion 252 is pivotable with respect to the seat portion 254.

The seat portion 254 is connected to a vehicle floor when in a use position. The seat portion 254 connects to the vehicle floor by means of various supports which are foldable to move from a use position to a stowed position.

Figure 3A:
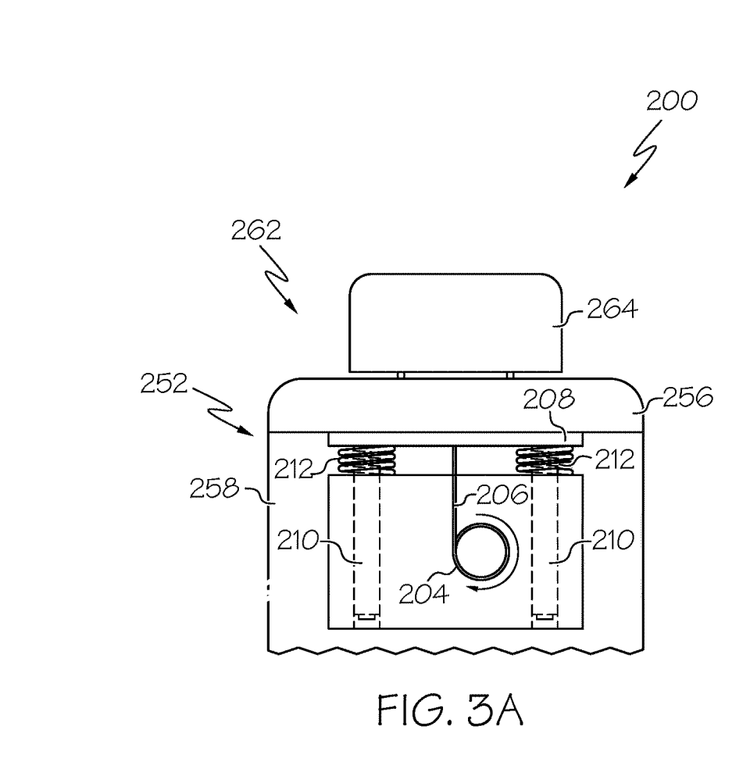
FIG. 3A illustrates a front view of the back portion having an extendable portion in the stowed position according to one or more embodiments shown and described herein.
Figure 3B:
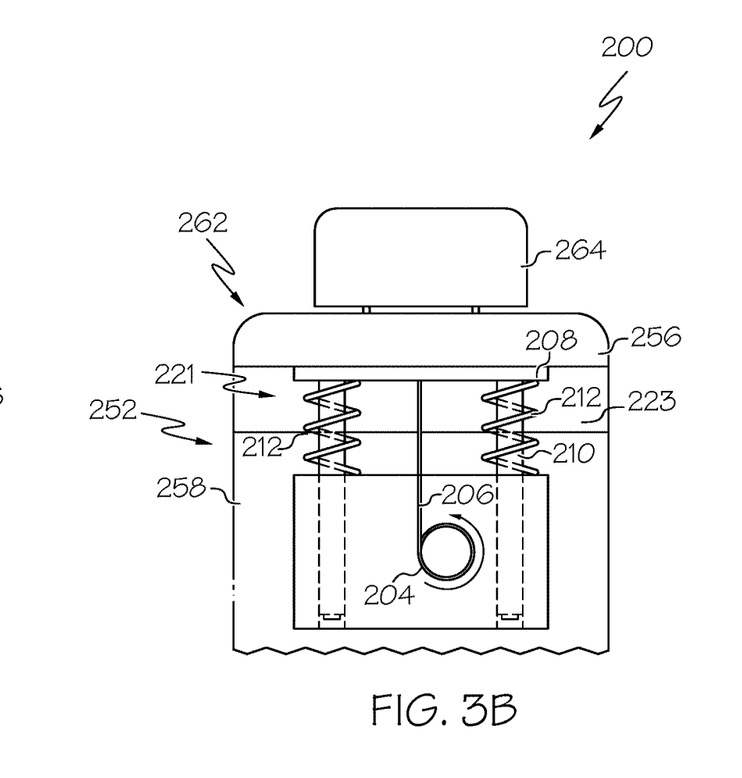
FIG. 3B illustrates the back portion and the extendable portion in a use position according to one or more embodiments shown and described herein.

With reference to FIGS. 3A-3B, the back portion 252 includes the base portion 258 and the extendable portion 256. The extendable portion 256 is movable with respect to the base portion 258 by means of an adjustment mechanism 262. When in an extended position, such as illustrated in FIG. 3B, an edge of the extendable portion 256 is spaced apart from an edge of the base portion 258. This spaced apart configuration in the release position creates a cavity 221 between the edges and a trim cover 223. The trim cover 223 supplies support to the users back on the back portion 252.

Figure 3C:
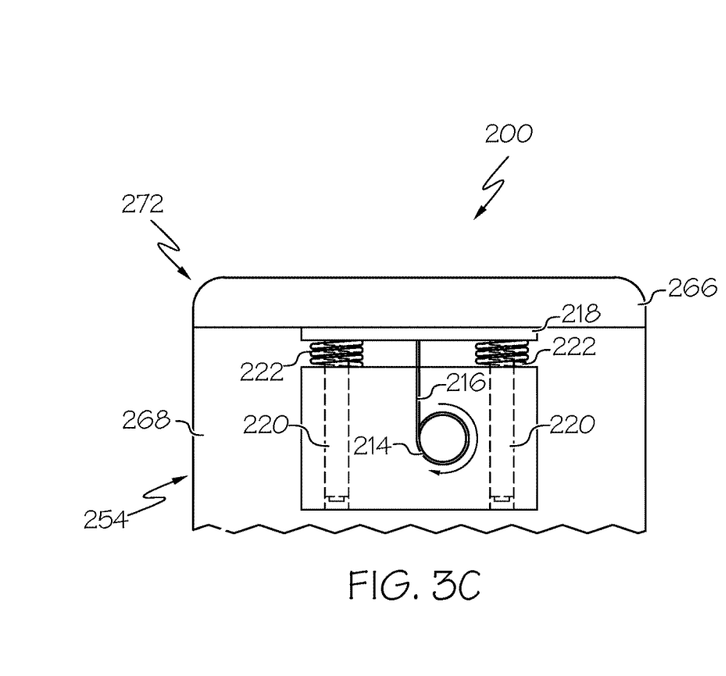
FIG. 3C illustrates a top view of the seat portion having an extendable position in the stowed position according to one or more embodiments shown and described herein.
Figure 3D:
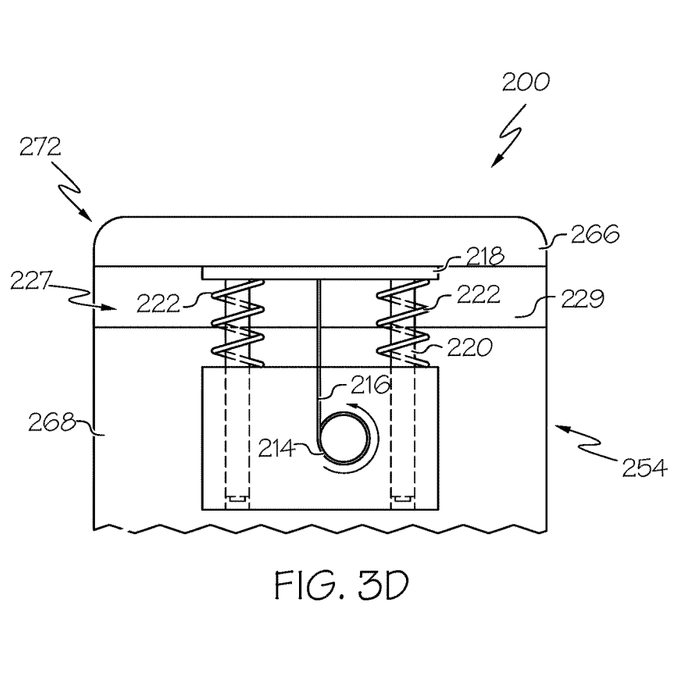
FIG. 3D illustrates a top view of the seat portion having a use position in the stowed position according to one or more embodiments shown and described herein.

With reference to FIGS. 3C-3D, when in a use position, an edge of the extendable portion 266 is spaced apart from the edge of the base portion 268 of the seat portion 254 to form a cavity 227. An adjustment mechanism 272 will be detailed in various embodiments as illustrated in FIGS. 3C-3D. When in the use position, a cavity 227 is created between the edges and a trim cover 229. The trim cover 229 supplies support to the users legs on the seat portion 254.

FIGS. 3A-3D illustrate one embodiment of the adjustment mechanisms 262, 272 for adjusting the extendable portions 256, 266 of the back portion 252 and the seat portion 254. With reference to FIGS. 3A-3B, the back portion 252 includes the adjustment mechanism 262. The adjustment mechanism 262 is provided to move the extendable portion 256 away from the base portion 258 of the back portion 252. The adjustment mechanism 262 includes a rotatable motor 204 configured to move the extendable portion 256 away from and toward the base portion 258. A pair of biasing members 212 exerts a force from the base portion 258 onto the extendable portion 256. The motor 204 connects the extendable portion 256 to the base portion 258. A pair of rods 210 further connects the extendable portion 256 to the base portion 258. A plate 208 facilitates the connection of the biasing members 212 between the extendable portion 106 and the base portion 108.

Similarly, FIGS. 3C and 3D illustrate the stowable seat 200 having the adjustment mechanism 272. The adjustment mechanism 272 includes a motor 214 and a corresponding wire 216 for moving the extendable portion 266 to and away from the base portion 268. The adjustment mechanism 272 further includes at least one biasing member 222 and a plate 218. The plate 218 facilitates the connection between the extendable portion 266 and the base portion 268. A pair of rods 220 facilitate in aligning and moving the extendable portion 266 to and from the base portion 268.

Now referring to FIGS. 4A-4D, a stowable seat 400 includes a back portion 402 and a seat portion 404. The back portion 402 includes a base portion 408 and an extendable portion 406. Similarly, the seat portion 404 includes a base portion 418 and an extendable portion 416. The stowable seat 400 generally includes a headrest 414 pivotable with respect to the back portion 402. The back portion 402 is pivotable with respect to the seat portion 404.

The seat portion 404 is connected to a vehicle floor when in a use position. The seat portion 404 connects to the vehicle floor by means of various supports which are foldable to move from a use position to a stowed position.

The back portion 402 includes the base portion 408 and the extendable portion 406. The extendable portion 406 is movable with respect to the base portion 408 by means of the adjustment mechanism 412. When in an extended position, such as illustrated in FIG. 4B, an edge of the extendable portion 406 is spaced apart from an edge of the base portion 408. This spaced apart configuration in the release position creates a cavity 421 between the edges and a trim cover 423. The trim cover 423 supplies support to the users back on the back portion 402.

Figure 4A:
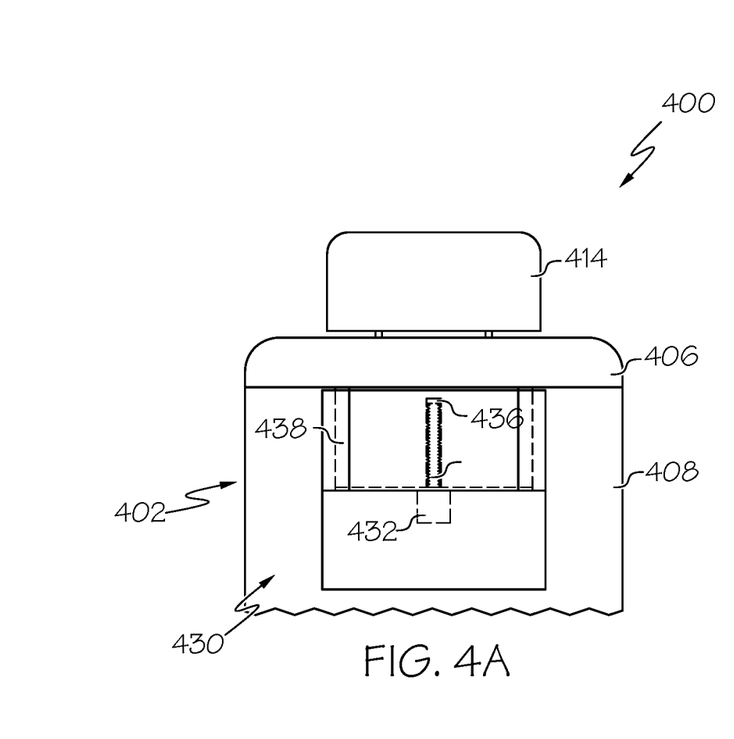
FIG. 4A illustrates an alternative embodiment front view of the back portion having an extendable portion in the stowed position according to one or more embodiments shown and described herein.
Figure 4B:
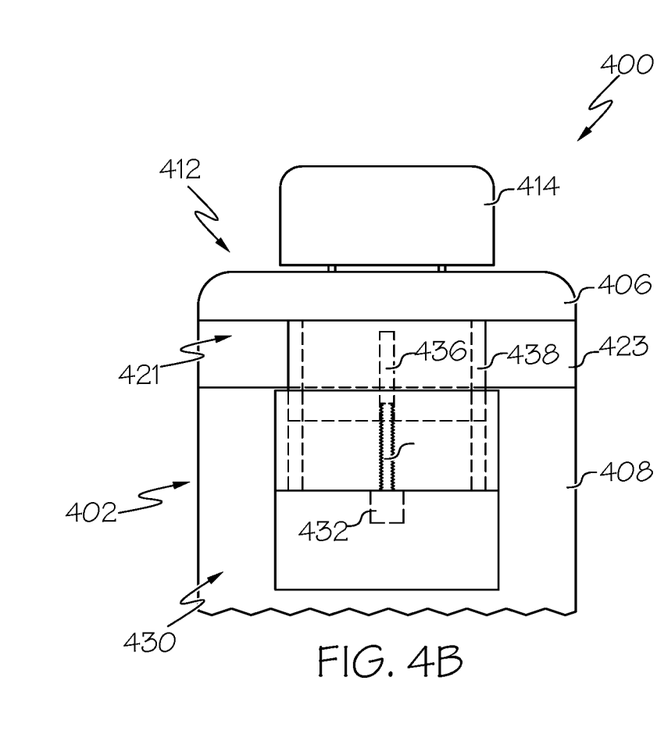
FIG. 4B illustrates an alternative embodiment back portion and the extendable portion in a use position according to one or more embodiments shown and described herein.
Figure 4C:
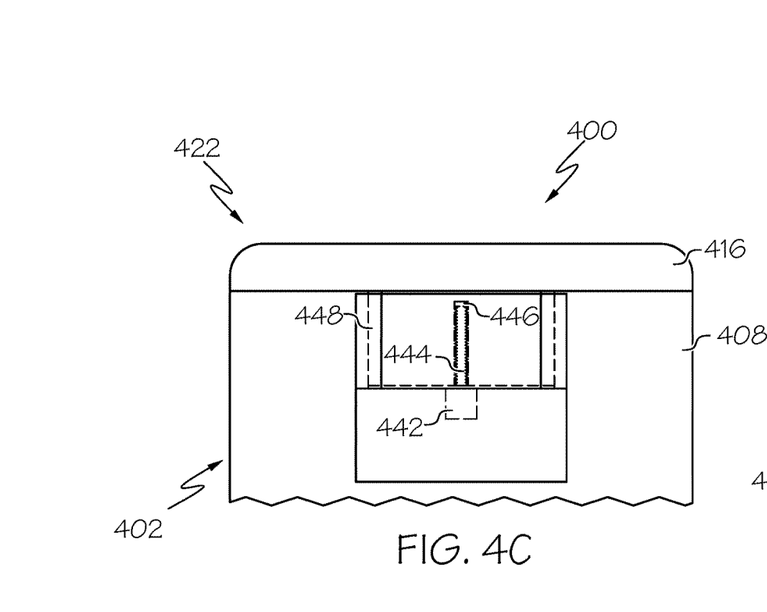
FIG. 4C illustrates an alternative embodiment top view of the seat portion having an extendable position in the stowed position according to one or more embodiments shown and described herein.
Figure 4D:
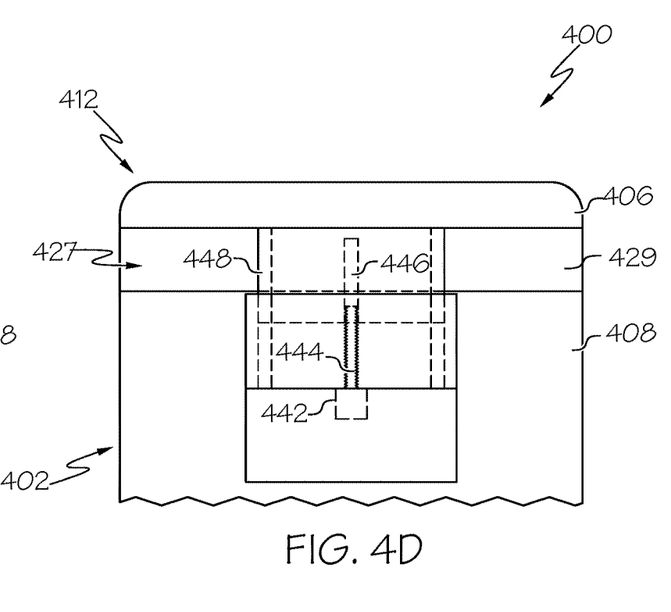
FIG. 4D illustrates an alternative embodiment top view of the seat portion having a use position in the stowed position according to one or more embodiments shown and described herein.

With reference to FIG. 4D, when in a use position, an edge of the extendable portion 416 of the seat portion is spaced apart from the edge of the base portion 418 of the seat portion 404. When in a use position, a cavity 427 is created between the edges and a trim cover 429. The trim cover 429 supplies support to the users legs on the seat portion 404.

With reference to FIGS. 4A-4D, alternative embodiments of adjustment mechanisms 412, 422 are illustrated. The seat back portion 402 includes a headrest 414 connected to the extendable portion 406. The extendable portion 406 is connected to the base portion 408. The adjustment mechanism 412 of the embodiment as illustrated in FIGS. 4A and 4B includes a screw drive assembly 430 having a motor 432 and a screw 434. The screw 434 is configured to be received within a threaded aperture 436. As the motor 432 actuates the screw 434, the extendable portion 406 moves away from the base portion 408. The screw drive assembly 430 further includes a base portion 438 which facilitates moving of the extendable portion 406.

FIGS. 4C and 4D illustrate the seat portion 404 having the extendable portion 416 connected to the base portion 418, and the adjustment mechanism 422. The adjustment mechanism 422 includes a screw drive assembly 440. The screw drive assembly 440 includes a motor 442 in communication with a screw 444. The screw 444 is in communication with a threaded aperture 446 which is connected to the extendable portion 416. The screw drive assembly 440 further includes a base portion 448 which facilitates moving of the extendable portion 416.

When the seat assembly is operated and moved from a use position to a stowed position, the extendable portions 406, 416 slowly move in towards the base portions 408, 418 as the seat assembly as a whole collapses. With reference again to the movement as illustrated in FIGS. 1A, 1B, 1C and 2, the seat assembly moves from a use position (FIGS. 1A, 3B and 3D) to a stowed position (FIGS. 1C, 4A, 4C) with an intermediate position (FIG. 1B) during the transition between the use position and the stowed position. As in prior embodiments, this movement is actuated either manually by the user or by a mechanically driven actuator or motor. In some embodiments, the user simply presses a button and the seat assembly as a whole moves from the use position (1A, 4B and 4D) to the stowed position (FIGS. 1C, 4A, 4C).

Referring now to FIGS. 5A-5D, a stowable seat 500 includes a back portion 502, a seat portion 504, and alternative embodiments of adjustment mechanisms 512, 522. The back portion 502 includes a base portion 508 and an extendable portion 506. The seat portion 504 includes a base portion 518 and an extendable portion 516. The stowable seat generally includes a headrest 514 pivotable with respect to the back portion 502. The back portion 502 is pivotable with respect to the seat portion 504.

The seat portion 504 is connected to a vehicle floor when in a use position (such as what is depicted in FIG. 1A). The seat portion 504 connects to the vehicle floor by means of various supports which are foldable to move from a use position to a stowed position.

Figure 5A:
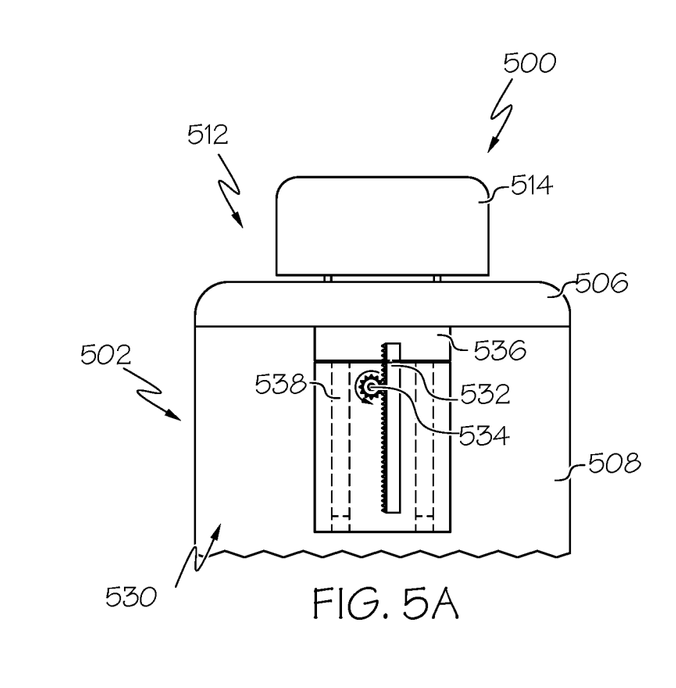
FIG. 5A illustrates another alternative embodiment front view of the back portion having an extendable portion in the stowed position according to one or more embodiments shown and described herein.
Figure 5B:
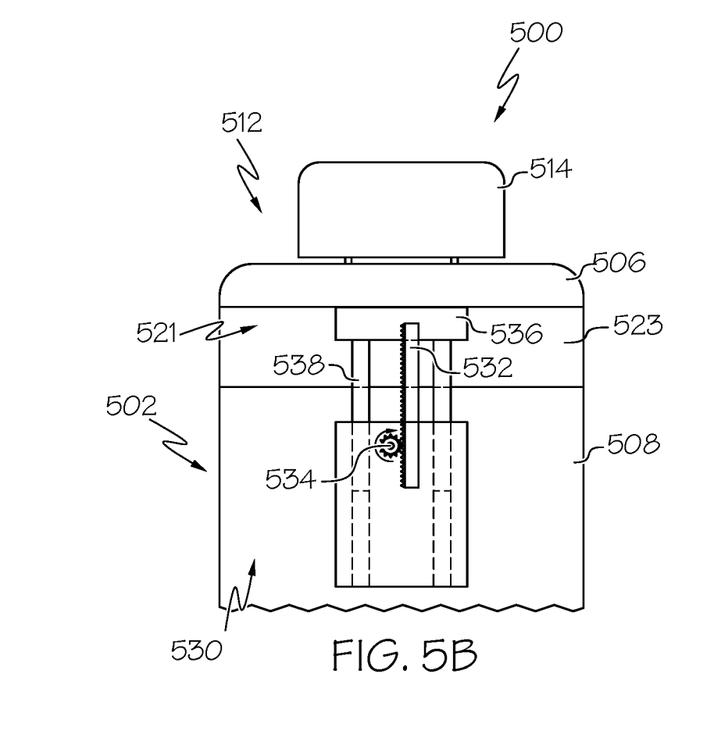
FIG. 5B illustrates another alternative embodiment back portion and the extendable portion in a use position according to one or more embodiments shown and described herein.

With reference to FIGS. 5A-5B, the back portion 502 includes the base portion 508 and the extendable portion 506. The extendable portion 506 is movable with respect to the base portion 508 by means of the adjustment mechanism 512. When in an extended position, such as illustrated in FIG. 5B, an edge of the extendable portion 516 is spaced apart from an edge of the base portion 508. The spaced apart configuration in the release position creates a cavity 521 between the edges and a trim cover 523. The trim cover 523 supplies support to the users back on the back portion 504.

Figure 5C:
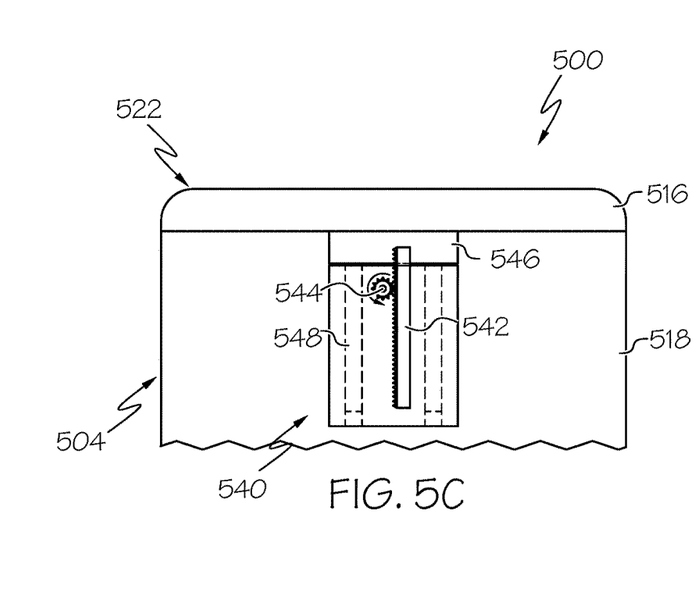
FIG. 5C illustrates another alternative embodiment top view of the seat portion having an extendable position in the stowed position according to one or more embodiments shown and described herein.
Figure 5D:
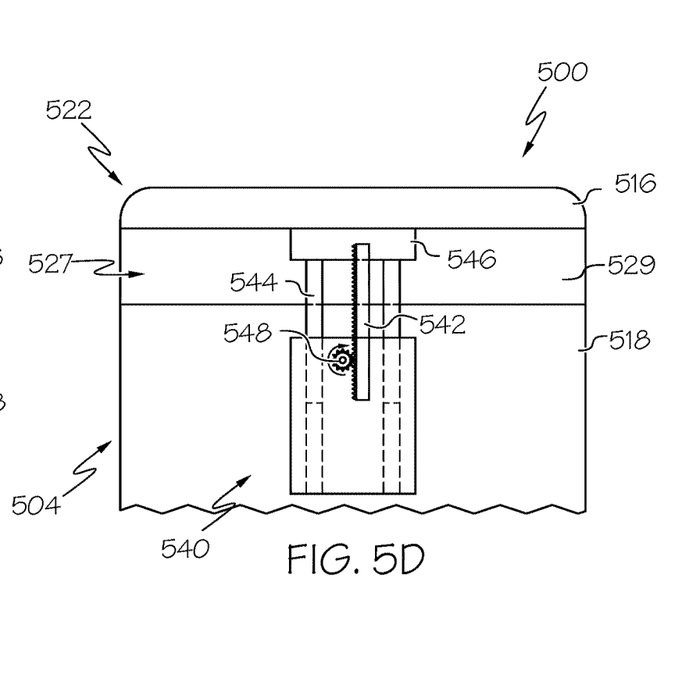
FIG. 5D illustrates another alternative embodiment top view of the seat portion having a use position in the stowed position according to one or more embodiments shown and described herein.

With reference to FIG. 5D, when in a use position, an edge of the extendable portion 516 of the seat portion is spaced apart from the edge of the base portion 518 of the seat portion 504. When in a use position, a cavity 527 is created between the edges and a trim cover 529. The trim cover 529 supplies support to the users legs on the seat portion 504.

Referring now to FIGS. 5A-5B, the alternative adjustment mechanism 512 includes a gear drive (or worm gear) assembly 530. FIGS. 5A and 5B illustrate the gear drive assembly 530 having an arm 532 with threaded portions in communication with a gear 534. The gear 534 rotates to drive the arm 532 forward thereby moving the extendable portion 506 to an extended position when in a use position. The gear 534 rotates to move the extendable portion 506 away from the base portion 508. The gear drive assembly 530 includes a plate 536 which facilitates connection of the arm 532 and the extendable portion 506. Arms 538 facilitate in moving the extendable portion 506 away from the base portion 508.

Similarly, FIGS. 5C and 5D illustrate the seat portion 504 having the extendable portion 516 and the base portion 518. The alternative adjustment mechanism 522 includes a gear drive (or worm gear) assembly 540 which includes an arm 542 having threaded portions connectable to a gear 544. As the gear 544 rotates, the extendable portion 516 moves away from the base portion 518. The gear drive assembly 540 includes a plate 546 which facilitates connection of the arm 542 and the extendable portion 516. Arms 548 facilitate in moving the extendable portion 516 away from the base portion 518.

When the seat assembly is operated and moved from a use position to a stowed position, the extendable portions 506, 516 slowly move in towards the base portions 508, 518 as the seat assembly as a whole collapses. With reference again to the movement as illustrated in FIGS. 1A, 1B, 1C and 2, the seat assembly moves from a use position (FIGS. 1A, 5B and 5D) to a stowed position (FIGS. 1C, 5A, 5C) with an intermediate position (FIG. 1B) during the transition between the use position and the stowed position. As in prior embodiments, this movement is actuated either manually by the user or by a mechanically driven actuator or motor. In some embodiments, the user simply presses a button and the seat assembly as a whole moves from the use position (1A, 5B and 5D) to the stowed position (FIGS. 1C, 5A, 5C).

Referring now to FIGS. 6A-6D a stowable seat 600 includes a back portion 602, a seat portion 604, and alternative embodiments of adjustment mechanisms 613, 623. The back portion 602 includes a base portion 608 and an extendable portion 506. The seat portion 604 includes a base portion 618 and an extendable portion 616. The stowable seat 600 generally includes a headrest 614 pivotable with respect to the back portion 602. The back portion 602 is pivotable with respect to the seat portion 604.

The seat portion 604 is connected to a vehicle floor when in a use position. The seat portion 604 connects to the vehicle floor by means of various supports which are foldable to move from a use position to a stowed position.

The back portion 602 includes the base portion 608 and the extendable portion 606. The extendable portion 606 is movable with respect to the base portion 608 by means of the adjustment mechanism 613. When in an extended position, such as illustrated in FIG. 6B, an edge of the extendable portion 606 is spaced apart from an edge of the base portion 608. The spaced apart configuration in the release position creates a cavity 621 between the edges and a trim cover 623. The trim cover 623 supplies support to the users back on the back portion 602.

Figure 6A:
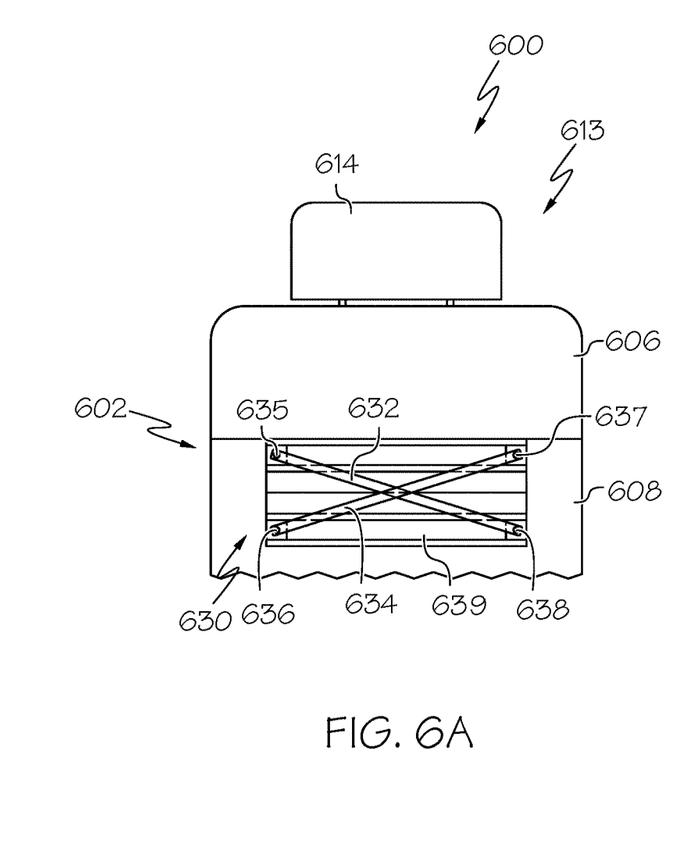
FIG. 6A illustrates yet another alternative embodiment front view of the back portion having an extendable portion in the stowed position according to one or more embodiments shown and described herein.
Figure 6B:
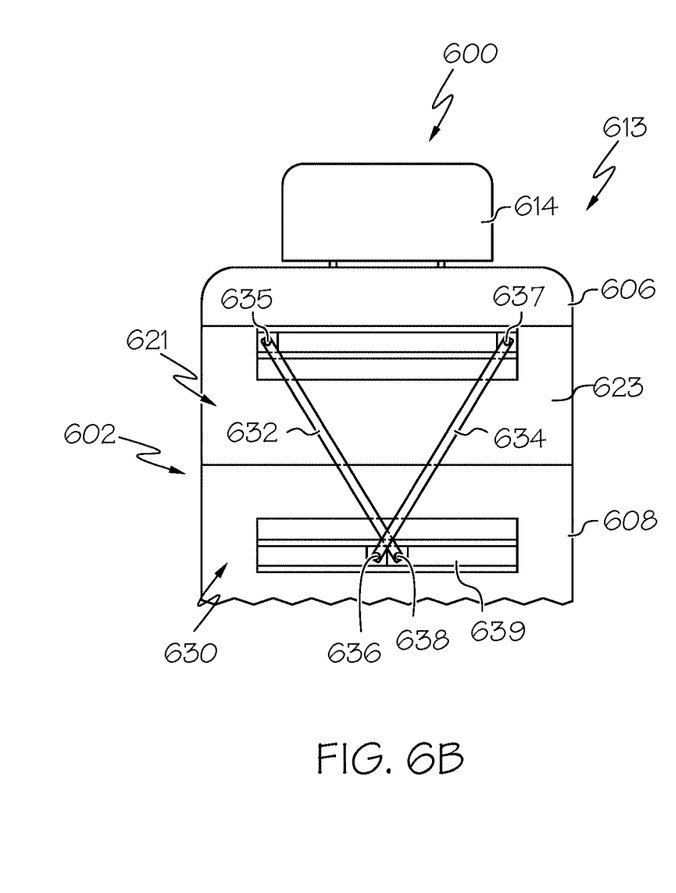
FIG. 6B illustrates yet another alternative embodiment back portion and the extendable portion in a use position according to one or more embodiments shown and described herein.
Figure 6C:
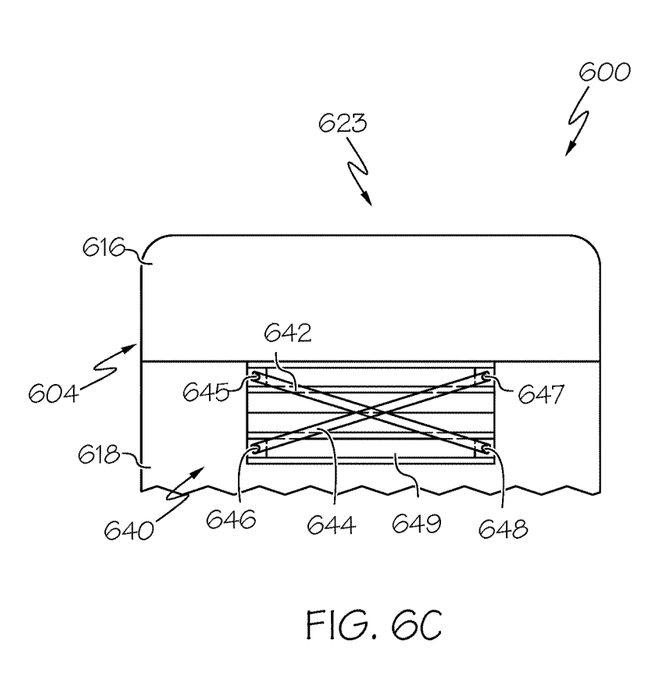
FIG. 6C illustrates yet another alternative embodiment top view of the seat portion having an extendable position in the stowed position according to one or more embodiments shown and described herein.
Figure 6D:
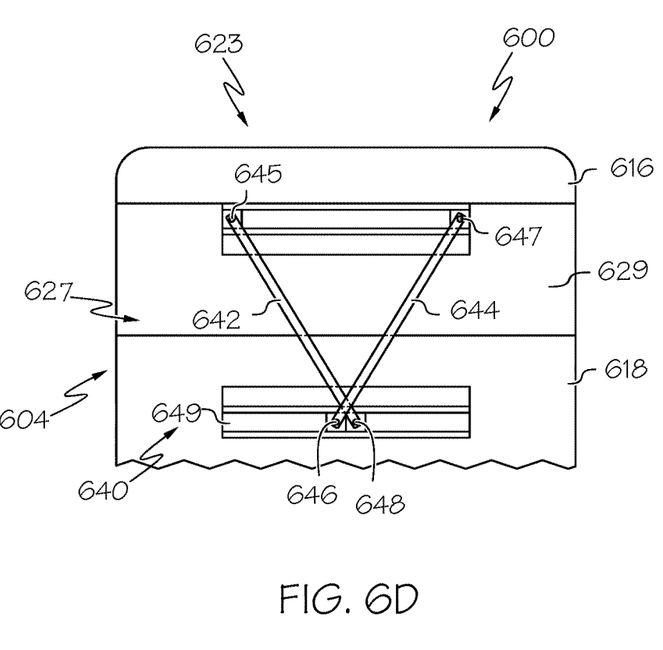
FIG. 6D illustrates yet another alternative embodiment top view of the seat portion having a use position in the stowed position according to one or more embodiments shown and described herein.

With reference to FIG. 6D, when in a use position, an edge of the extendable portion 616 of the seat portion is spaced apart from the edge of the base portion 618 of the seat portion 604. When in a use position, a cavity 627 is created between the edges and a trim cover 629. The trim cover 629 supplies support to the users legs on the seat portion 604.

Referring now to FIGS. 6A-6D, the adjustment mechanism assembly 613 includes an arm linkage adjustment assembly 630 used in connection with the above mentioned stowable seat 600. FIGS. 6A and 6B depict the arm linkage adjustment assembly 630 of the seat back portion 602. The seat back portion 602 includes a headrest 614 connected to the extendable portion 606. The extendable portion 606 is connected to the base portion 608. In the present embodiment, the arm linkage adjustment assembly 630 includes two arms 632, 634 which are slidably connected to the extendable portion 606 and the base portion 608. The arms 632, 634 include slidable connection points. The connection points 509, 510, 513 are slidable within channels 639 517. A motor or other actuator (not shown) can help facilitate movement of the arms 632, 634.

The seat portion 604 includes the extendable portion 616 connected to the base portion 618. The adjustment mechanism 623 includes an arm linkage adjustment assembly 640. The arm linkage adjustment assembly 640 includes two arms 642, 644 which are slidably connected to the extendable portion 616 and the base portion 618. The arms 642, 644 include slidable connection points 645, 646, 647, 648 which are positioned within a slidable track 649 530. An actuator or motor may help facilitate movement of the arms 642, 644 to move the extendable portion 516 away from the base portion 618.

When the seat assembly is operated and moved from a use position to a stowed position, the extendable portions 606, 616 slowly move in towards the base portions 608, 618 as the seat assembly as a whole collapses. With reference again to the movement as illustrated in FIGS. 1A, 1B, 1C and 2, the seat assembly moves from a use position (FIGS. 1A, 6B and 6D) to a stowed position (FIGS. 1C, 6A, 6C) with an intermediate position (FIG. 1B) during the transition between the use position and the stowed position. As in prior embodiments, this movement is actuated either manually by the user or by a mechanically driven actuator or motor. In some embodiments, the user simply presses a button and the seat assembly as a whole moves from the use position (1A, 6B and 6D) to the stowed position (FIGS. 1C, 6A, 6C).

The present specification is advantageous in that it allows a designer to use a significantly smaller stowage area to stow a vehicle seat. By enabling the seat portion and the back portion to decrease in length prior to stowing, the bucket within the floor where the seat is stowed can by significantly smaller. For illustration purposes, referring to FIG. 1A, the bucket of the present specification can be up to X [dimension] smaller as compared to buckets of the prior art. If the prior art has a length X, the dimension of the indention of the present specification is X-Z. This allows the designers of the vehicle to have more floor surface area thus enabling additional space for other storage or for connecting other vehicle elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A stowable seat for a vehicle comprising:
a seat portion pivotably connected to a back portion;
the back portion having a first base portion and a first extendable portion, the first extendable portion movable from a stowed position to an extended position, the extended position defined when the first extendable portion is spaced apart from the first base portion; and
the seat portion having a second base portion and a second extendable portion, the second extendable portion movable from a stowed position to an extended position, the extended position defined when the second extendable portion is spaced apart from the second base portion;
wherein the stowable seat is configured to move to a stowed position only after the first extendable portion of the back portion and the second extendable portion of the seat portion are moved to the stowed position.

2. The stowable seat for a vehicle of claim 1 wherein a motor is used to move the first extendable portion and/or the second extendable portion.

3. The stowable seat for a vehicle of claim 2 wherein at least one biasing member is configured to move the first extendable portion and/or the second extendable portion.

4. The stowable seat for a vehicle of claim 2 wherein a screw drive is configured to move the first extendable portion and/or the second extendable portion.

5. The stowable seat for a vehicle of claim 2 wherein a worm gear is configured to move the first extendable portion and/or the second extendable portion.

6. The stowable seat for a vehicle of claim 2 wherein a bar linkage system is configured to move the first extendable portion and/or the second extendable portion.

7. A vehicle comprising:
a compartment within a vehicle floor;
a seat having at least one extendable portion, the seat movable from a use position to a stowed position,
the use position defined when the extendable portion is in an at least partially extended position; and
the stowed position defined when the extendable portion is not extended and the seat is stowed in the compartment of the vehicle.

8. The vehicle of claim 7 wherein the seat includes an actuator adapted to move the seat from the use position to the stowed position.

9. The vehicle of claim 7 wherein the seat includes an actuator adapted to move the seat from the stowed position to the use position including moving the extendable portion to the use position.

10. The vehicle of claim 7 wherein the seat is manually movable between the use and stowed positions.

11. The vehicle of claim 7 wherein unless the extendable portion is retracted, the seat will not fit within the compartment.

12. The vehicle of claim 7 wherein the extendable portion is on a base portion of a seat portion of the seat.

13. The vehicle of claim 7 wherein the extendable portion is on a base portion of a back portion of the seat.

14. The vehicle of claim 7 wherein there are two total extendable portions, a first extendable portion of the back portion and a second extendable portion on the seat portion.

15. A stowable seat for a vehicle comprising:
a seat portion pivotably connected to a back portion, the seat portion connected to a floor within the vehicle;
a storage portion on the floor, the seat portion and the back portion stowable within the storage portion; and
one of the back portion or the seat portion having a base portion and an extendable portion, the extendable portion movable from a stowed position to an extended position, the extended position defined when the extendable portion is spaced apart from the base portion;
wherein the seat is configured to move to a stowed position only after the extendable portion and the extendable portion are moved to the to the stowed position.

16. The stowable seat for a vehicle of claim 15 wherein at least one biasing member is configured to move the extendable portion.

17. The stowable seat for a vehicle of claim 15 wherein a screw drive is configured to move the extendable portion.

18. The stowable seat for a vehicle of claim 15 wherein a worm gear is configured to move the extendable portion.

19. The stowable seat for a vehicle of claim 15 wherein a screw drive is configured to move the extendable portion.

20. The stowable seat for a vehicle of claim 15 wherein a bar linkage system is configured to move the extendable portion.

* * * * *

UNITED STATES PATENT AND TRADEMARK OFFICE
CERTIFICATE OF CORRECTION

PATENT NO. : 9,764,661 B2  
APPLICATION NO. : 14/989084  
DATED : September 19, 2017  
INVENTOR(S) : Hansen et al.

Page 1 of 1

It is certified that error appears in the above-identified patent and that said Letters Patent is hereby corrected as shown below:

On the Title Page

Item (72), add inventor --Matthew Lund, Ann Arbor, MI (US)--.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*